US011544787B2

(12) United States Patent
Yang et al.

(10) Patent No.: US 11,544,787 B2
(45) Date of Patent: Jan. 3, 2023

(54) APPARATUS AND METHOD FOR PROVIDING PROTOCOL FOR DIGITAL ASSET TRADING

(71) Applicant: Hong Kong Applied Science and Technology Research Institute Company Limited, Hong Kong (HK)

(72) Inventors: Ze Yang, Hong Kong (HK); Zhibin Lei, Hong Kong (HK); Yang Liu, Hong Kong (HK); Kangheng Wu, Hong Kong (HK); Shiyu Liao, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 313 days.

(21) Appl. No.: 16/916,095

(22) Filed: Jun. 29, 2020

(65) Prior Publication Data

US 2021/0407001 A1 Dec. 30, 2021

(51) Int. Cl.
*G06Q 40/04* (2012.01)
*G06Q 20/06* (2012.01)
(Continued)

(52) U.S. Cl.
CPC ......... *G06Q 40/04* (2013.01); *G06Q 20/0652* (2013.01); *G06Q 20/3678* (2013.01); *H04L 9/0637* (2013.01)

(58) Field of Classification Search
None
See application file for complete search history.

(56) References Cited

U.S. PATENT DOCUMENTS

2015/0220928 A1 8/2015 Allen
2015/0363769 A1 12/2015 Ronca et al.
(Continued)

FOREIGN PATENT DOCUMENTS

CN 109087080 A 12/2018
CN 109242674 A 1/2019
(Continued)

OTHER PUBLICATIONS

Zie, Jy., et al. Data Privacy Management, Cryptocurrencies and Blockchain Technology. DPM CBT 2019 2019. Lecture Notes in Computer Science( ), vol. 11737. Springer, Cham. https://doi.org/10.1007/978-3-030-31500-9_14 (2019). (Year: 2019).*
(Continued)

*Primary Examiner* — Elizabeth H Rosen
(74) *Attorney, Agent, or Firm* — Idea Intellectual Limited; Margaret A. Burke; Sam T. Yip (57) ABSTRACT

A method for a protocol in digital asset trading includes step as follow. Trading information is exchanged between the first and the second nodes, in which a first digital currency belonging to the first node and a second digital currency belonging to the second node are expected to be exchanged, and prices of the first and second digital currencies are time-dependent. An atomic swap script and a smart contract are generated. A compensation fee to be paid to the second node by the first node is computed. A redeeming or refunding event is performed in response to the atomic swap script and the smart contract with paying the compensation fee to the second node, in which the compensation fee is dependent on the prices of the first and second digital currencies such that is time-dependent.

16 Claims, 6 Drawing Sheets

(51) Int. Cl.
*G06Q 20/36* (2012.01)
*H04L 9/06* (2006.01)

(56) References Cited

U.S. PATENT DOCUMENTS

| | | |
|---|---|---|
| 2016/0328705 A1 | 11/2016 | Sebag et al. |
| 2019/0333057 A1* | 10/2019 | Miller ................. G06Q 20/351 |
| 2020/0005284 A1* | 1/2020 | Vijayan ................. G06Q 20/36 |
| 2020/0065899 A1 | 2/2020 | Fritsch et al. |
| 2020/0098042 A1 | 3/2020 | Hoshizuki |
| 2020/0111159 A1* | 4/2020 | Sambhar ................ G06Q 20/12 |

FOREIGN PATENT DOCUMENTS

| | | |
|---|---|---|
| CN | 110084594 A | 8/2019 |
| WO | 2017145017 A1 | 8/2017 |
| WO | 2019220270 A1 | 11/2019 |

OTHER PUBLICATIONS

Han, Runchao, Haoyu Lin, and Jiangshan Yu. "On the optionality and fairness of Atomic Swaps." The First ACM Conference on Advances in Financial Technologies (AFT'19), Oct. 2019. (Year: 2019).*

Pan, Yuting, Xiaosong Zhang, Yi Wang, Junhui Yan. "Application of Blockchain in Carbon Trading," 10th International Conference on Applied Energy (ICAE2018), (Aug. 22-25, 2018), Hong Kong, China. (Year: 2018).*

Runchao Han et al., "On the optionality and fairness of atomic swaps" Proceedings of the 1st ACM Conference on Advances in Financial Technologies, 2019, p. 1-13.

International Search Report of corresponding PCT Patent Application No. PCT/CN2020/099615 dated Mar. 25, 2021.

* cited by examiner

APPARATUS AND METHOD FOR PROVIDING PROTOCOL FOR DIGITAL ASSET TRADING

FIELD OF THE INVENTION

The present invention generally relates to the field of digital asset trading based on blockchain technology. More specifically, the present invention relates to techniques of providing a fair-trading protocol suitable for digital cryptocurrencies trading, carbon emission trading, and trading of other assets capable of being identified and represented digitally.

BACKGROUND OF THE INVENTION

A blockchain is a peer-to-peer (P2P) electronic ledger which is implemented as a computer-based decentralized and distributed system. In general, a ledger is made up of blocks, which in turn are made up of transactions. Each transaction is a data structure that encodes the transfer of a digital asset or resource between participants in the blockchain system and includes at least one input and output. Each block contains the hash of the previous block, and all of the blocks are chained together to create a permanent blockchain. For a permanent blockchain, from the time of its inception, the transaction records, which have been written to the blockchain, are unalterable.

Blockchains form the bedrock for cryptocurrencies, such as Bitcoin (BTC), Ethereum (ETH), Tether, XRP, and the likes. For example, one of the features of the BTC blockchain system is the Proof-of-Work (PoW) design. In the PoW design, users have to prove that they have performed work by solving a computational-complex mathematic problem, including verification of a transaction to be added to the blockchain. If the problem is solved, a block is allowed to be added to the blockchain and the verified transaction becomes public record. Correspondingly, the first user who successfully solved the PoW problem is rewarded for the effort with cryptocurrency. This is also referred to as "mining."

Most cryptocurrencies operate without the need for a central authority, which not only reduces the risks of single point of failure, control, and security vulnerability, but also eliminates many of the processing and transaction costs.

Recently, the concept of atomic swap has gained much attentions in the cryptocurrency community. An exchange between the parties is "atomic" in the sense that all parties receive their desired resource (i.e., cryptocurrency token or coin) or no one does. An atomic swap is a proposed feature in cryptocurrencies that allows for exchange of one cryptocurrency for another cryptocurrency (i.e., exchanging between BTC and ETH) without the need for a trusted third party. This is also known as cross chain transaction. In traditional cryptocurrencies, a trusted third party such as a cryptocurrency exchange is necessary to perform a swap of cryptocurrencies of different types in order to prevent one party from sending a currency without receiving a currency in return. An atomic swap system uses a hash time-locked smart contract so that a party must deliver the currency to be swapped within a specified time, or else the transaction will be cancelled.

Since the currency will be swapped within a specific time, there is always a fairness issue that the buyer has the advantage to proceed or abort the swap before the time limit and this is unfair to the seller. Accordingly, there is a need in the art of a new approach for cryptocurrencies exchange that can address this fairness deficiency.

SUMMARY OF THE INVENTION

The present invention provides a method and an apparatus for a protocol for digital asset trading. In accordance to various embodiments of the present invention, the method includes the steps as follows. Trading information is exchanged between a first node and a second node by a computing system, in which a first digital currency belonging to the first node and a second digital currency belonging to the second node are expected to be exchanged, and prices of the first and second digital currencies are time-dependent. A smart contract is generated by the computing system. An atomic swap script is executed according to the smart contract by the computing system. A compensation fee to be paid to the second node by the first node is calculated by the computing system. A redeeming event or a refunding event is raised and processed in response to the atomic swap script with a computation of the compensation fee payable to the second node, wherein the execution of the atomic swap script starts at an initial point $t_0$ in time, the redeeming event or the refunding event is raised at an action point $t$ in time, and the compensation fee is dependent on the prices of the first and second digital currencies during an interval from $t_0$ to $t$.

In one embodiment, the smart contract sets a time limit, $t_1$, for the second node's participation in the exchange, where $t_0 < t < t_1$. When the second digital currency is accepted by the first node, a redeeming event is raised and processed, the compensation fee is computed:

$$C_t = \max(\max(0, L_t), E_t);$$

$$N_{2,t_0} = N_{1,t_0} * r_{t_0};$$

$$L_t = -(N_{1,t_0} * P_{1,t} - N_{2,t_0} * P_{2,t_0});$$

$$E_t = \max(N_{1,t_0} * P_{1,t} - N_{2,t_0} * P_{2,t}); \text{ and}$$

$$t_0 < t < t_1;$$

wherein $C_t$ is the compensation fee; $L_t$ is the asset value devaluation of the second node; $E_t$ is maximum potential trading return; $N_{1,t_0}$ is the amount of BTC to be traded at time $t_0$; $P_{1,t}$ is the price of BTC at the action point $t$; $N_{2,t_0}$ is the amount of ETH to be traded at time $t_0$; $P_{2,t_0}$ is the price of the ETH at the initial point $t_0$, and $r_{t_0}$ is the agreed exchange rate at time $t_0$.

If the first node refuses to redeem the second digital currency but instead raises a refunding event, the compensation fee is then computed:

$$C_t = \max(D_t, E_t);$$

$$N_{2,t_0} = N_{1,t_0} * r_{t_0};$$

$$D_t = -(N_{2,t_0} * P_{2,t} - N_{2,t_0} * P_{2,t_0});$$

$$E_t = \max(N_{1,t_0} * P_{1,t} - N_{2,t_0} * P_{2,t}); \text{ and}$$

$$t_1 < t < t_2;$$

wherein $C_t$ is the compensation fee; $D_t$ is asset devaluation; $E_t$ is maximum potential trading return; $N_{1,t_0}$ is the amount of BTC to be traded at time $t_0$; $P_{1,t}$ is the price of BTC at the action point $t$; $N_{2,t_0}$ is the amount of ETH to be traded at time $t_0$; $P_{2,t_0}$ is the price of the ETH at the initial point $t_0$; $P_{2,t}$ is the price of ETH at the action point $t$; and $r_{t_0}$ is the agreed exchange rate at time $t_0$.

In various embodiments, the first node is connected to a first blockchain such that the first digital currency is a cryptocurrency built based on the first blockchain. The second node is connected to a second blockchain such that the second digital currency is a cryptocurrency built based on the second blockchain. The digital asset trading is a cross-chain transaction.

In various embodiments, an apparatus is provided for implementing the protocol for digital asset trading, wherein the apparatus includes a computing system, a first node, and a second node, which are in communication with each other. And the computing system is configured to execute the method as above.

In accordance to the applications of the various embodiments of the present invention, a method for digital asset trading is provided and conducted based on the Carbon trading ecosystem, and one of the first and second digital currencies represents Carbon emission allowance.

The advantages of the present invention include: (1) whether a redeeming event or a refunding event happens, the result accompanies a compensation fee that promotes fairness between an initiator and a participator; (2) since the compensation fee is dependent on the fluctuating prices of digital currencies during the exchanging transaction, it compels the initiator to take into consideration the increase in compensation fee and in turn encourages early completion of the exchange transaction; and (3) a higher compensation fee in response to a refunding event providing disincentive for cancellation of the exchange transaction. As such, the goal of providing a fair-trading protocol is achieved.

BRIEF DESCRIPTION OF THE DRAWINGS

Embodiments of the invention are described in more details hereinafter with reference to the drawings, in which.

DETAILED DESCRIPTION

In the following description, methods and apparatuses for providing a protocol for digital asset trading, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In the present disclosure, a protocol for digital asset trading is built and implemented by one or more computing systems, each includes at least one specially configured computer processor. In various embodiments, the computing systems include mobile computing devices, physical processing servers, virtual servers, Cloud servers, the likes, or combinations thereof configured to communicate with each other by wired or wireless data connection, thereby constructing an online community. In this regard, the term "online community" means a virtual community which is also referred to as an Internet community or web community, and its members interact with each other via the Internet.

Figure 1:
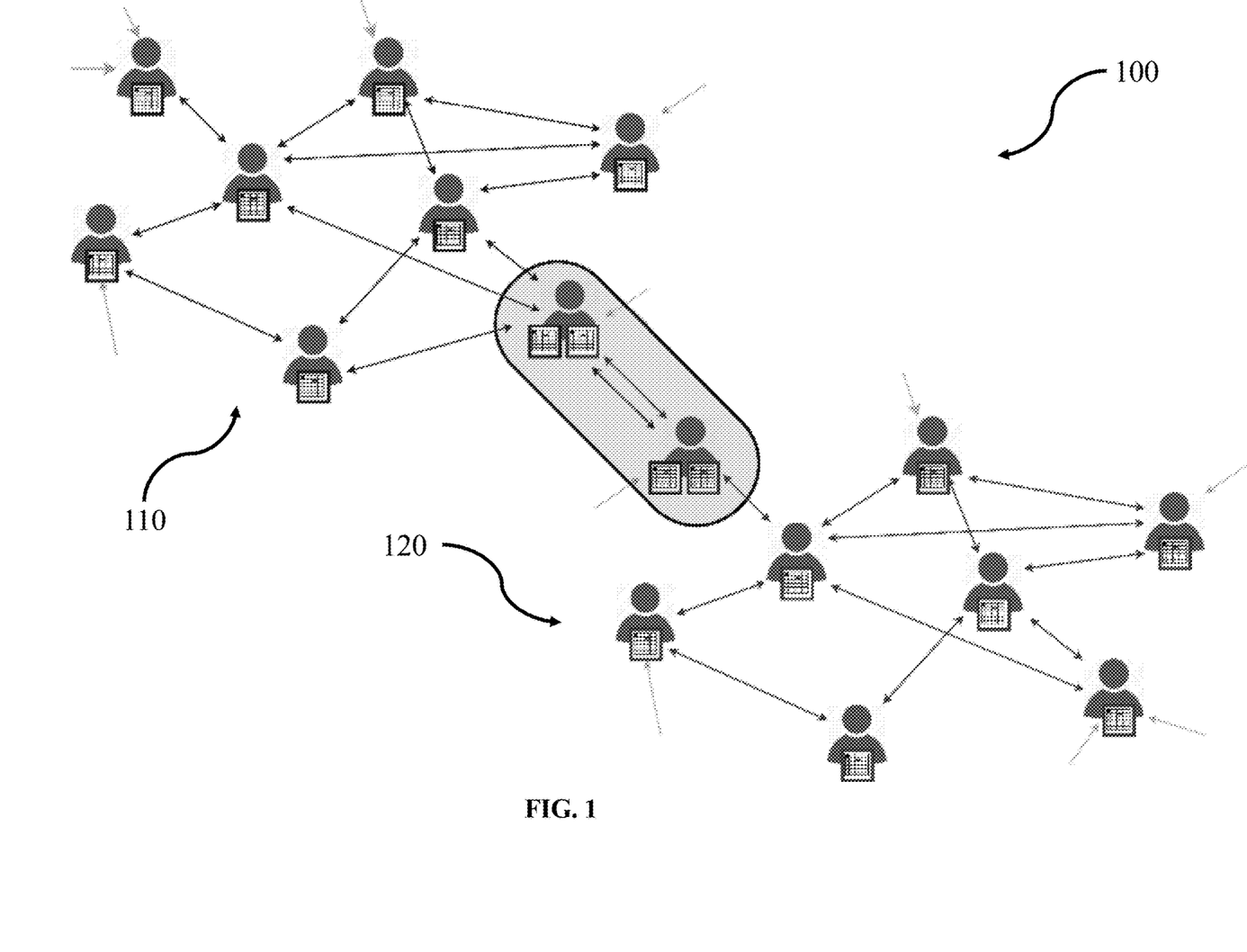
FIG. 1 depicts a schematic diagram of an exemplary embodiment of a data network connecting two online communities.

FIG. 1 depicts a schematic diagram of an exemplary embodiment of data network 100 connecting two online communities and according to various embodiments of the present invention. The digital asset trading involves the trading of two different digital currencies widely circulated in and used by their respective communities. The two online communities in communication with each other via the Internet are a first blockchain community 110 and a second blockchain community 120. Herein, a blockchain community is a virtual data chain formed by a series of blocks, which are verified and referencing each other. As an exemplary embodiment, the first and second blockchain communities 110 and 120 are the Bitcoin blockchain and the Ethereum blockchain respectively, and they have respective digital currencies/cryptocurrencies built based on the corresponding blockchains, i.e., BTC for the Bitcoin blockchain and ETH for the Ethereum blockchain. In the present disclosure, the aforesaid example involving the Bitcoin blockchain and the Ethereum blockchain and the corresponding BTC and ETH cryptocurrencies is used to illustrate a typical implementation of the present invention, and is not meant to be a limitation thereof. An ordinarily skilled person in the art can readily adapt, apply, and implement the present invention to other existing and foreseeable blockchain-based systems without deviation from the spirit of the invention or undue experimentation.

Figure 2:
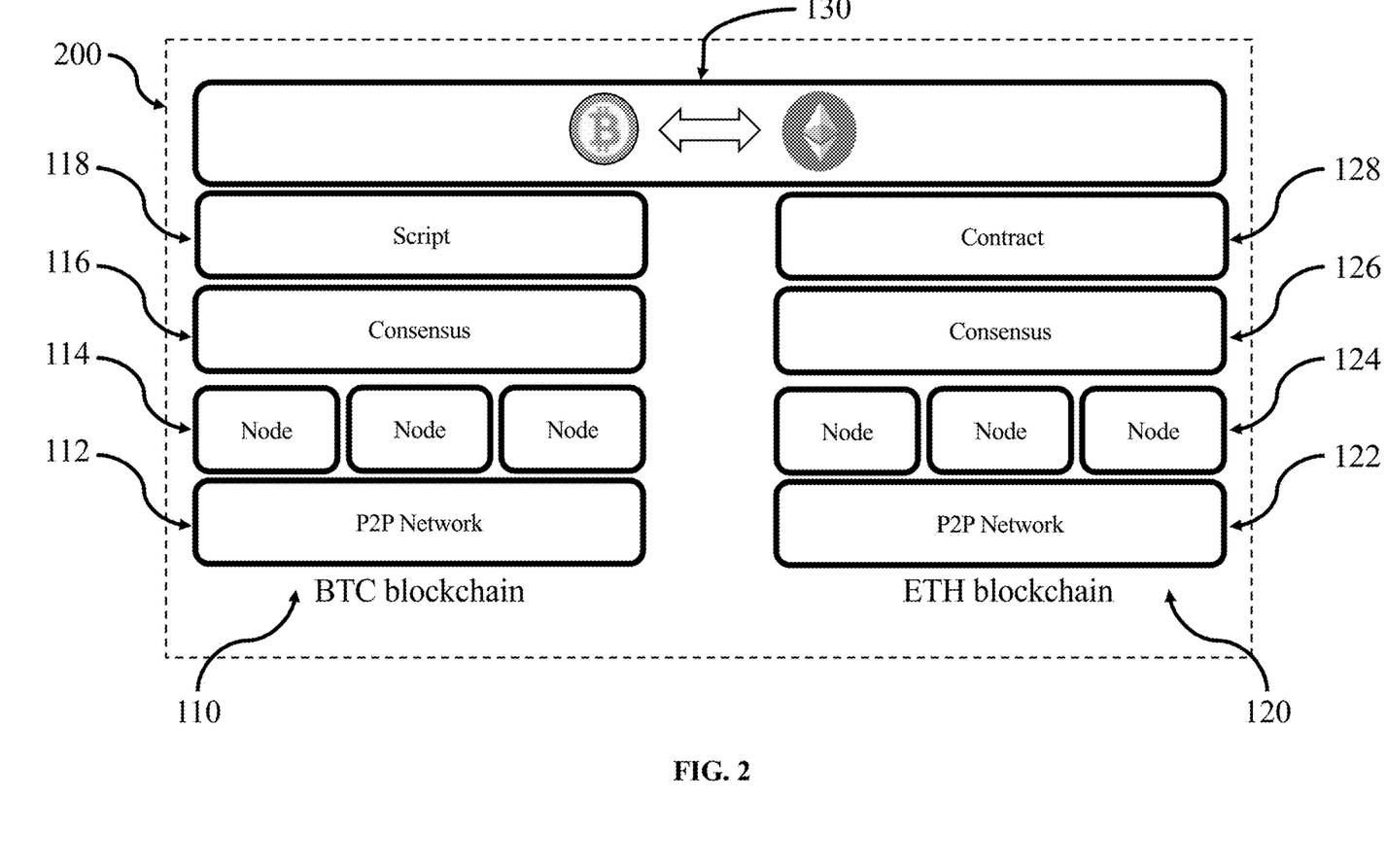
FIG. 2 depicts a simplified logical structure of the two blockchain communities according to various embodiments of the present invention.

FIG. 2 depicts a simplified logical structure of the two blockchain communities 110 and 120 according to various embodiments of the present invention. The first blockchain community 110 (i.e., the Bitcoin blockchain) has a layered architecture hosted on a computing system 200 and including a P2P network layer 112, a node layer 114, a consensus layer 116, and a script layer 118.

The P2P network layer 112 is a computer network where nodes (each computing device or user in a P2P network is referred to as node) are decentralized and distributed. The P2P network layer 112 is responsible for internode communication, such as transactions and block propagation. Accordingly, the P2P network layer 112 ensures that nodes are available to discover and communicate with each other, so as to enable the first blockchain community 110 in an active state.

The node layer 114 is constructed by the nodes joining the transactions on the first blockchain community 110. The nodes in the P2P network are allowed to compute and validate transactions then store them in a shared ledger, which results in a distributed database recording all relevant information. In some embodiments, the nodes are not only responsible for validating transactions, but also organizing them into blocks and broadcasting the blocks to the first blockchain community 110. Since the Bitcoin blockchain is based on a Proof-of-Work (PoW) consensus design, one of the nodes can compete with the others in the P2P network to solve the PoW problem and verify transactions according to certain hash algorithms and available computing capacities (i.e., the fastest available node verifies the transaction and produces a new block to be added to the chain). In various embodiments, a new block is cryptographically signed by its corresponding node with its private key, which is also referred to as a signature. In the PoW design, nodes compete against each other to solve the PoW problem and get rewarded. In some practical cases, the term "node" is equivalent to terms "miner" or "block creator".

The consensus layer 116 is responsible for validating the blocks, ordering the blocks, and ensuring the agreements by all nodes. In various embodiments, the consensus layer 116 provides consensus protocols (algorithms) between the nodes in the P2P network, which describes the format of a ledger that is publicly visible. Specifically, the consensus layer 116 handles the enforcement of network rules that describe what nodes within the P2P network should do to reach consensus about the broadcasted transactions. Furthermore, the consensus layer 116 also handles the generation and verification of blocks. With the consensus layer 116, authoritative power in the first blockchain community 110 is assured to remain decentralized and distributed, such that control by single entity is impossible.

The script layer 118 is responsible for implementing at least one script (a set of machine instructions specifically designed to instruct computing devices to carry out tasks in data transactions). For the Bitcoin blockchain, the primary application is P2P transactions, and the Bitcoin blockchain defines and executes transactions through at least one script (in a simple stack-based and non-Turing-complete language). The script may comprise a set of opcodes or commands. When one of the nodes (a sender) sends BTC to another node(s) (a recipient(s)) in a transaction, instructions for how the recipient gained access to these BTC are encoded within the script. In various embodiments, a smart contract is generated by using at least one script with a set of opcodes or commands, and the logic of atomic swap is implemented by a locked script and an unlocked script contained in the transaction.

Similarly, the second blockchain community 120 (i.e., the Ethereum blockchain) has a layered architecture hosted on the computing system 200 and includes a P2P network layer 122, a node layer 124, and a consensus layer 126. These layers of the second blockchain community 120 are similar or identical to those of the first blockchain community 110, and therefore the aforementioned descriptions are similarly applicable to the second blockchain community 120. However, at least one difference between the first and second blockchain communities 110 and 120 is that the second blockchain community 120 includes a contract layer 128, instead of the script layer. More specifically, the second blockchain community 120 acts as a decentralized platform that manages contracts (i.e., smart contracts), such that transactions are carried out exactly as programmed without any possibility of third-party interference. In this regard, developers may use programmable language, such as Solidity, to write a smart contract, which results in a unique address assigned to the smart contract. As such, any node in the second blockchain community 120 is able to execute a transaction according to the smart contract.

In practical cases, based on an atomic swap protocol it is possible to exchange cryptocurrencies of different blockchain communities with each other, which is referred to as cross chain transaction. However, the existing atomic swap protocol lacks fairness, resulting from an advantage of an initiator in the exchange. With respects to a trade between the first and second blockchain communities 110 and 120, a fair-trading protocol of the present invention is provided to address the fairness issue of exchanging cryptocurrencies (i.e., BTC and ETH) thereof. Embodiments of the present invention are illustrated using the below-described exemplary transactions between a first blockchain community node and a second blockchain community node exchanging cryptocurrencies with each other using a fair-trading protocol 130.

Figure 3:
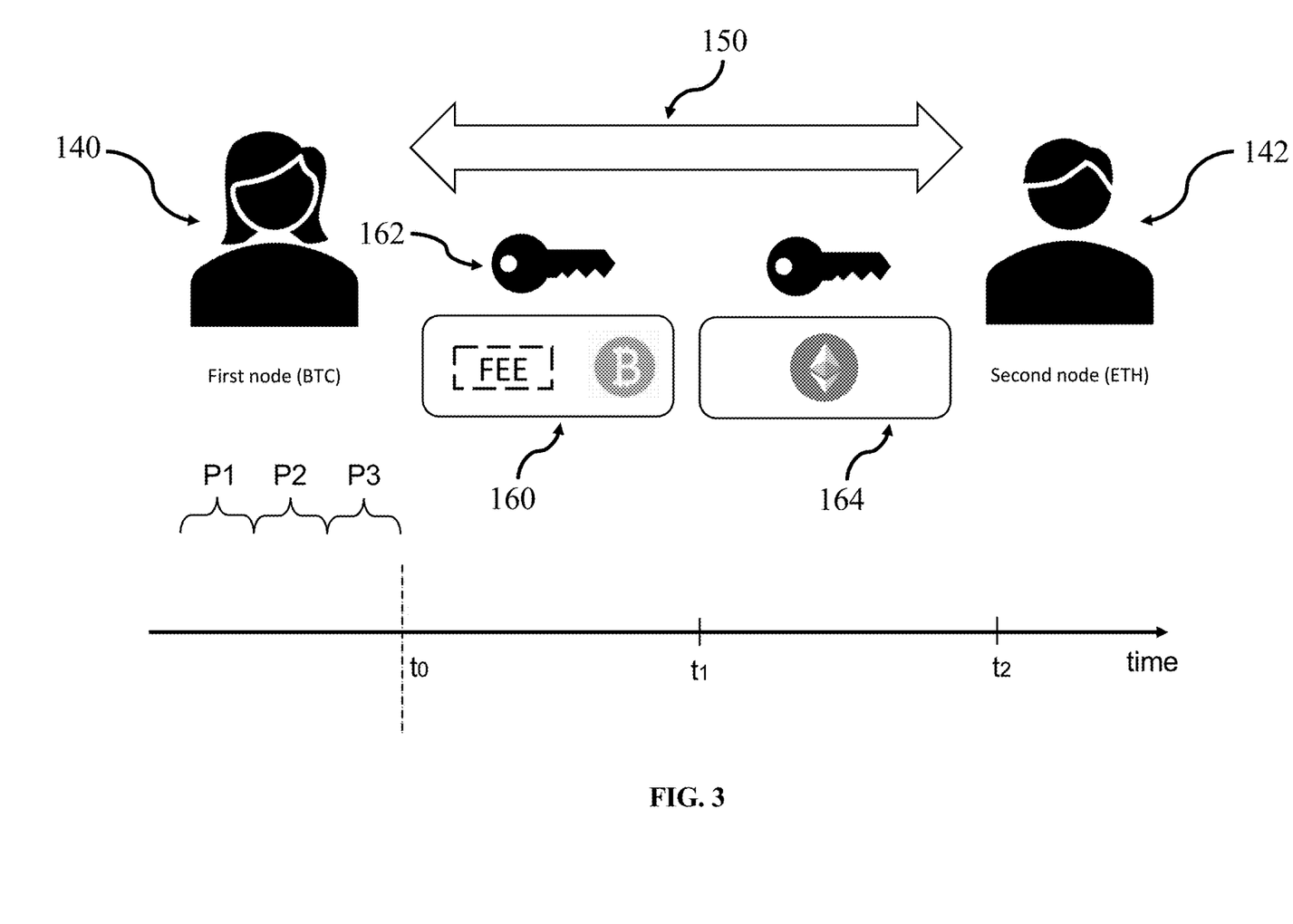
FIGS. 3 and 4 depict two schematic diagrams illustrating an exchange transaction between BTC and ETH by the first and second nodes according to the various embodiments of the present invention.

Referring to FIG. 3. A first node 140 (i.e., a node in the first blockchain community) invites a second node 142 (i.e., a node in the second blockchain community) for a trade in exchanging BTC for ETH, and the second node 142 agrees with the demands of the first node 140. In this trade, the first node 140 is an initiator and the second node 142 is a participator. Herein, it is assumed that an exchange rate is 1 BTC to 57.07 ETH (i.e., the first and second nodes 140 and 142 agree on the exchanging of 0.01 BTC for 0.57 ETH initially). However, actual prices of BTC and ETH (i.e., price in U.S. Dollars) are time-dependent. That is, even though the first and second nodes 140 and 142 agree on the exchange rate of 1 BTC to 57.07 ETH, the prices may fluctuate and differ from the initial exchange rate of 1 BTC to 57.07 ETH.

In a first phase P1, trading information 150 between the first and second nodes 140 and 142 are exchanged. The trading information includes at least account address, pay amount, transaction fee, Hash160 of the secret, lock times of the first and second nodes 140 and 142.

In a second phase P2, the first node 140 deposits its BTC to be exchanged into a lockbox 160 (i.e., into a data memory at a particular address in the P2P network). For conditions of opening the lockbox 160, it requires the first node's secret 162, the second node's signature, and its opening within a time limit placed on the first node 140 (i.e., 24 hours or longer)'s participation in the exchange transaction. The first node's secret 162 is randomly selected by the first node 140. For example, the first node 140 may select a string of alpha-numeric characters as the secret 162 and the Hash160 of the secret 162 is correspondingly computed. In one embodiment, these conditions are laid out in a smart contract, which is generated by using at least one script with a set of opcodes or commands, and the time limit and the Hash160 of the secret 162 of the first node 140 are included in the trading information. In addition, the first node 140 deposits into the lockbox 160 an adequate amount of BTC to cover a compensation fee "FEE" to be determined and paid to the second node 142 at a subsequent action point in time.

In a third phase P3, the second node 142 deposits its own ETH to be exchanged into a lockbox 164 (i.e., into a data memory at a particular address in the P2P network). For conditions of opening the lockbox 164, it requires the first node's secret 162, the first node's signature, and opening it within a time limit on the second node 142's participation in the exchange transaction, in which the time limit on the second node 142 is shorter than that on the first node 140. For example, as the time limit on the first node 140 is set at 24 hours, the time limit on the second node 142 may be set at 12 hours. In various embodiments, these conditions are embedded and deployed in the smart contract, and the time limit on the second node 142 is included in the trading information, and can be adjusted based on needs.

After the third phase P3, the exchange transaction goes into a waiting state until the first node 140 opens the lockbox 164 of the second node 142, and proceeds an atomic swap script according to the smart contract. To illustrate, the starting time of the atomic swap script is at an initial point in time, which is labeled in FIG. 3 as "$t_0$", and the time limits on the first and second nodes 140 and 142 are labeled in FIG. 3 as "$t_2$" and "$t_1$", respectively. The steps of exchanging trading information and generating the smart contract are performed prior to the initial point $t_0$.

Figure 4:
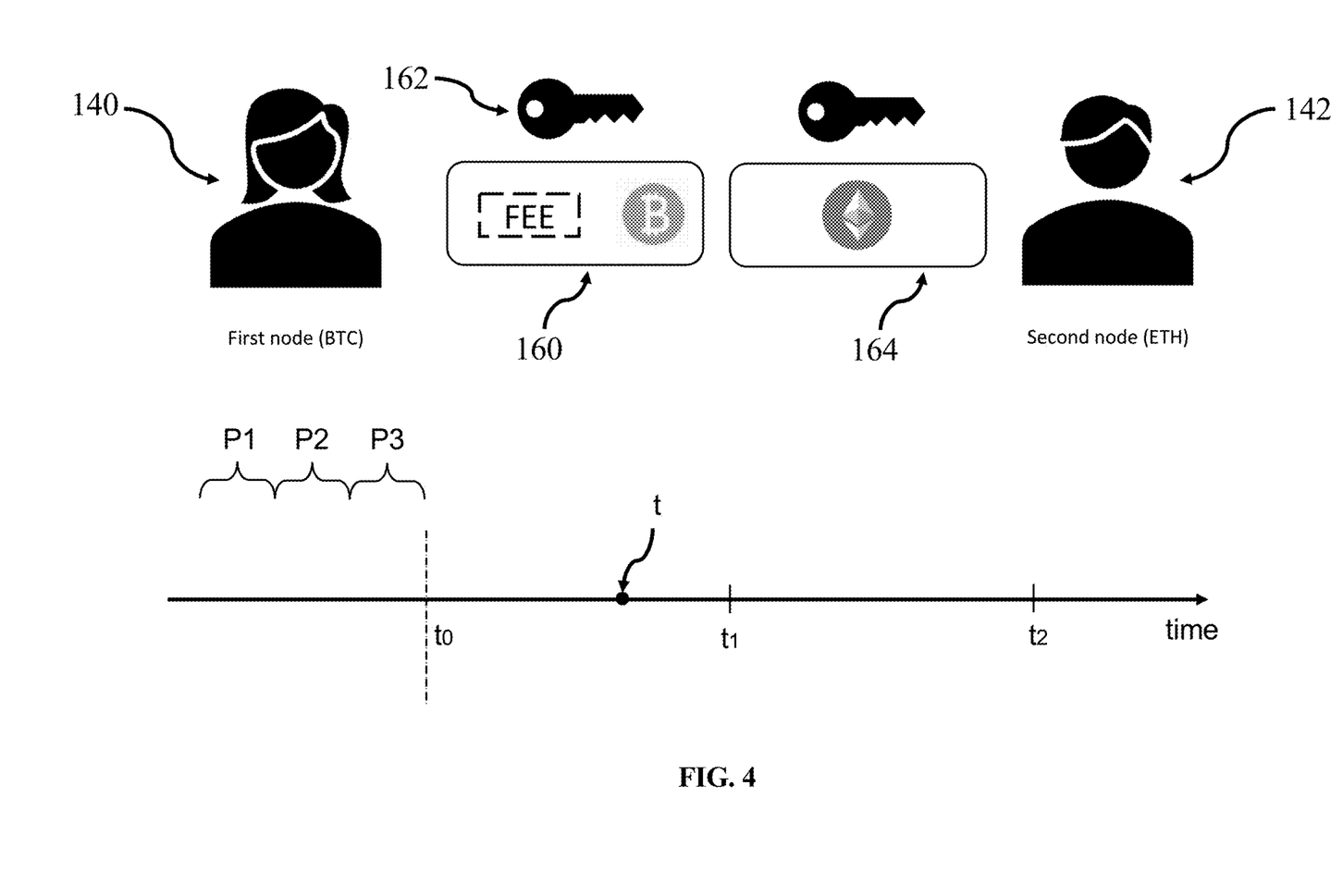
Figure 5:
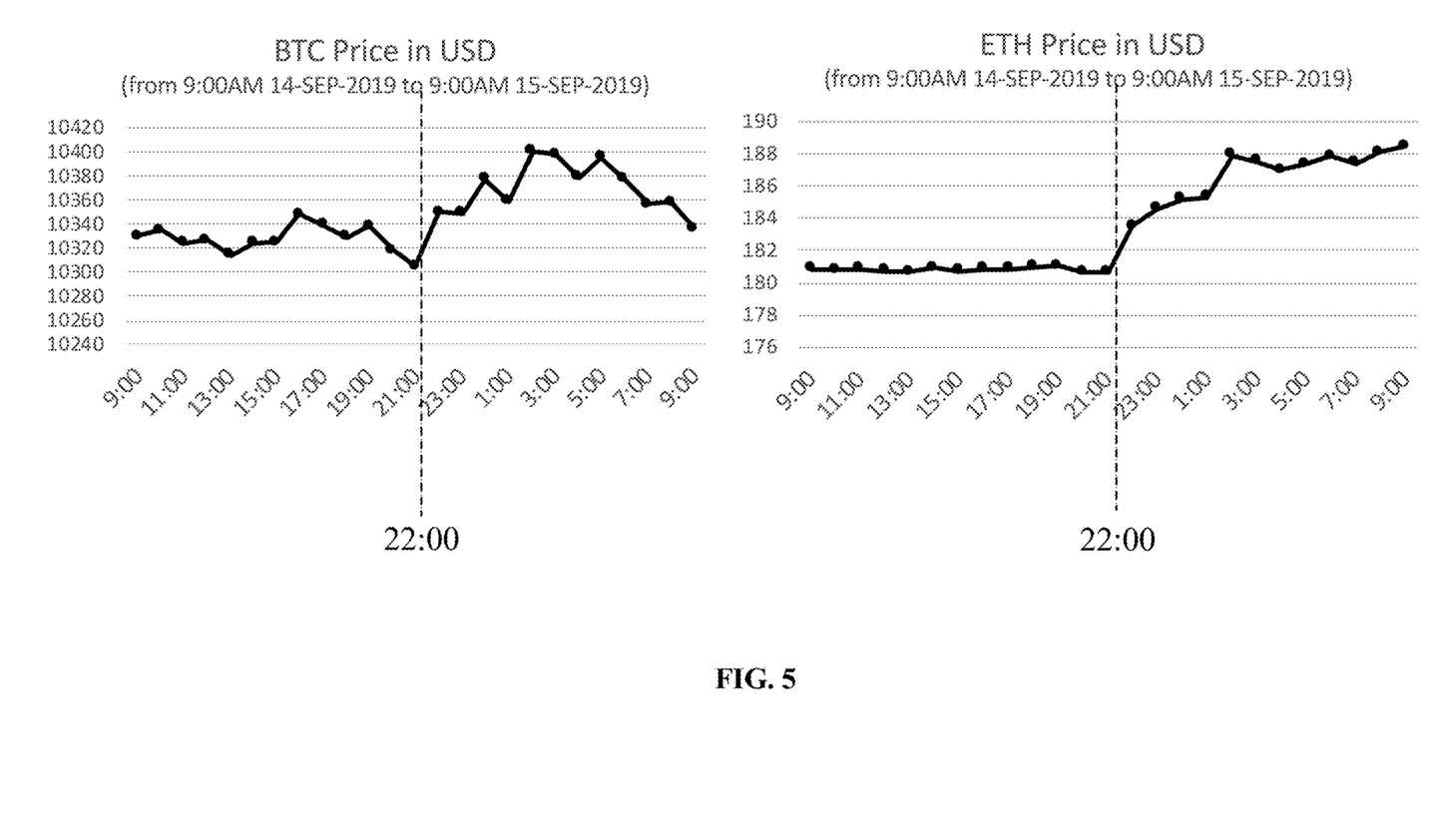
FIG. 5 shows the historical prices of BTC and ETH.

Referring to FIGS. 4 and 5. Before the time limit, $t_1$, on the second node 142's participation is reached, the first node 140 takes action at an action point "t" in time as labeled in FIG. 4, and the action raises a redeeming event or a refunding event, which is defined in response to the atomic swap script. The prices of BTC and ETH are retrieved and updated by the computing system via a data communication link to a price database of the cryptocurrency market, and the step of updating/renewing the cryptocurrency prices is simultaneously performed with the exchange transaction.

When the first node 140 opens the lockbox 164 with its own secret and signature, it is referred to as a redeeming event that the first node 140 redeems ETH from the lockbox 164. Next, as the redeeming event happens at the action point t, where $t_0 < t < t_1$, it triggers a computation of compensation fee to be paid to the second node 142. That is, the compensation fee is calculated and determined at the same time as the redeeming event happens at the action point t. For the redeeming event, the computation of the compensation fee is governed by the following compensation formulas:

$$C_t = \max(\max(0, L_t), E_t);$$

$$N_{2,t_0} = N_{1,t_0} * r_{t_0};$$

$$L_t = -(N_{1,t_0} * P_{1,t} - N_{2,t_0} * P_{2,t_0});$$

$$E_t = \max(N_{1,t_0} * P_{1,t} - N_{2,t_0} * P_{2,t}); \text{ and}$$

$$t_0 < t < t_1;$$

wherein $C_t$ is the compensation fee; $L_t$ is the asset value devaluation of the second node; $E_t$ is maximum potential trading return; $N_{1,t_0}$ is the amount of BTC to be traded at time $t_0$; $P_{1,t}$ is the price of BTC at the action point t; $N_{2,t_0}$ is the amount of ETH to be traded at time $t_0$; $P_{2,t_0}$ is the price of the ETH at the initial point $t_0$; and $r_{t_0}$ is the agreed exchange rate at time $t_0$.

To illustrate, it is assumed that the initial point $t_0$ is 09:00-September-14-2019 and the action point t is 22:00-September-14-2019, as shown FIG. 5, and thus $P_{1,t}$ and $P_{2,t_0}$ are the prices of BTC and ETH corresponding thereto respectively. The first node 140 desires to trade 0.01 BTC for 0.57 ETH with the second node 142, thus the agreed exchange rate is 1 BTC to 57.07 ETH. With these conditions, the compensation fee $C_t$ to be paid to the second node 142 when both nodes redeemed successfully is calculated as follows:

$$N_{2,t_0} = N_{1,t_0} * r_{t_0} = 0.01 * 57.07 = 0.5707;$$

$$L_t = -(N_{1,t_0} * P_{1,t} - N_{2,t_0} * P_{2,t_0}) = -(0.01 * 10350.36 - 0.5707 * 180.85) = -0.2925;$$

$$E_t = \max(N_{1,t_0} * P_{1,t} - N_{2,t_0} * P_{2,t}) = 0.33; \text{ and}$$

$$C_t = \max(\max(0, L_t), E_t) = 0.33;$$

wherein in determining $E_t$, the following method is followed: assume the exchange is completed at time t, vary t from $t_0$ to the action point in time (i.e., from 9:00 to 22:00) with a time interval (i.e., 10 mins) that is small enough such that the prices of both BTC and ETH do not change dramatically), calculate $N_{1,t_0} * P_{1,t} - N_{2,t_0} * P_{2,t}$ for each time point, and take the maximum one.

As such, the first node 140 is required to add 0.33 USD or $3.2 \times 10^{-5}$ BTC in the lockbox 160 as the compensation fee. Thereafter, the second node 142 redeems BTC and the compensation fee. In this regard, when opening the lockbox 164 and redeeming ETH, the secret 162 of the first node 140 is revealed to the second node 142. Therefore, the second node 142 is able to open the first node's lockbox 160 with the secret 162 and its own signature before the time limit $t_2$, so as to redeem the BTC and the compensation fee.

On the other hand, if the first node 140 refuses to redeem ETH, the exchange is cancelled and the corresponding BTC and ETH in the respective lockbox are refunded back to the respective parties. This is referred to as a refunding event, and it triggers a calculation of the compensation fee to be paid to the second node 142. The compensation fee is calculated and determined at the same time as the refunding event is raised at the action point t in time. For the refunding event, the computation of the compensation fee is governed by the following formulas:

$$C_t = \max(D_t, E_t);$$

$$N_{2,t_0} = N_{1,t_0} * r_{t_0};$$

$$D_t = -(N_{2,t_0} * P_{2,t} - N_{2,t_0} * P_{2,t_0});$$

$$E_t = \max(N_{1,t_0} * P_{1,t} - N_{2,t_0} * P_{2,t}); \text{ and}$$

$$t_1 < t < t_2;$$

wherein $C_t$ is the compensation fee; $D_t$ is asset devaluation; $E_t$ is maximum potential trading return; $N_{1,t_0}$ is the amount of BTC to be traded at time $t_0$; $P_{1,t}$ is the price of BTC at the action point t; $N_{2,t_0}$ is the amount of ETH to be traded at time $t_0$; $P_{2,t_0}$ is the price of the ETH at the initial point $t_0$; and $P_{2,t}$ is the price of ETH at the action point t; and $r_{t_0}$ is the agreed exchange rate at time $t_0$.

To illustrate, it is assumed that the initial point $t_0$ is 09:00-September-14-2019 and the action point t is 22:00-September-14-2019, as shown FIG. 5, and $P_{1,t}$ and $P_{2,t_0}$ are the prices of BTC and ETH respectively. The first node 140 desires to trade 0.01 BTC for 0.57 ETH with the second node 142, thus the agreed exchange rate is 1 BTC to 57.07 ETH. With these conditions, the compensation fee $C_t$ to be paid to the second node 142 when both nodes are refunded is calculated as follows:

$$D_t = -(N_{2,t_0} * P_{2,t} - N_{2,t_0} * P_{2,t_0}) = -(0.5707 * 183.52 - 0.5707 * 180.85) = -1.5238;$$

$$E_t = \max(P_{1,t} - P_{2,t}) = 4.28; \text{ and}$$

$$C_t = \max(D_t, E_t) = 4.28.$$

As such, the first node 140 is required to add 4.28 USD or $4.14 \times 10^{-4}$ BTC in the lockbox 160 as the compensation fee. In addition, once the first node 140 refuses to redeem ETH, the second node 142 receives the refund of ETH, and the first node 140 receives the refund of BTC subsequently.

In one embodiment, the compensation formulas for redeeming and refunding are embedded and deployed in the smart contract.

With the max functions in the compensation formulas, even when the initiator deliberately redeems after observing an exchange rate counterpart in the counterpart currency, the original or the maximum price of the opposite currency during the exchange transaction time interval is considered in the compensation formulas such that the participator is fairly compensated. More specifically, if the counterpart currency appreciates, the initiator has to pay higher compensation fee; but if the counterpart currency depreciates, no reward is reaped by the initiator because the original price of the counterpart currency is used in the compensation calculation. As such, from the point of view of the initiator, regardless of counterpart currency's exchange rate movement, its cost position does not improve by waiting to redeem, hence incentivize an early completion of the exchange transaction.

On the contrary, if the time limit on the second node 142 lapses without any action taken by the first node 140, a refunding event is raised, and the refund of the BTC and the ETH back to the first and second nodes 140 and 142 is processed.

Therefore, whether a redeeming event or a refunding event is raised, a compensation fee always accompanies the event. Since the compensation fee is dependent on the prices of BTC and ETH during the time interval from the initial point $t_0$ to the action point t, the first node 140 is compelled to consider a possibility of compensation fee increase. As such, the best option for the first node 140 is to complete the exchange transaction early. Moreover, as there is also a high probability to pay higher compensation fee in response to a refunding event, it serves as a discouragement to the first node 140 to cancel the exchange.

Figure 6:
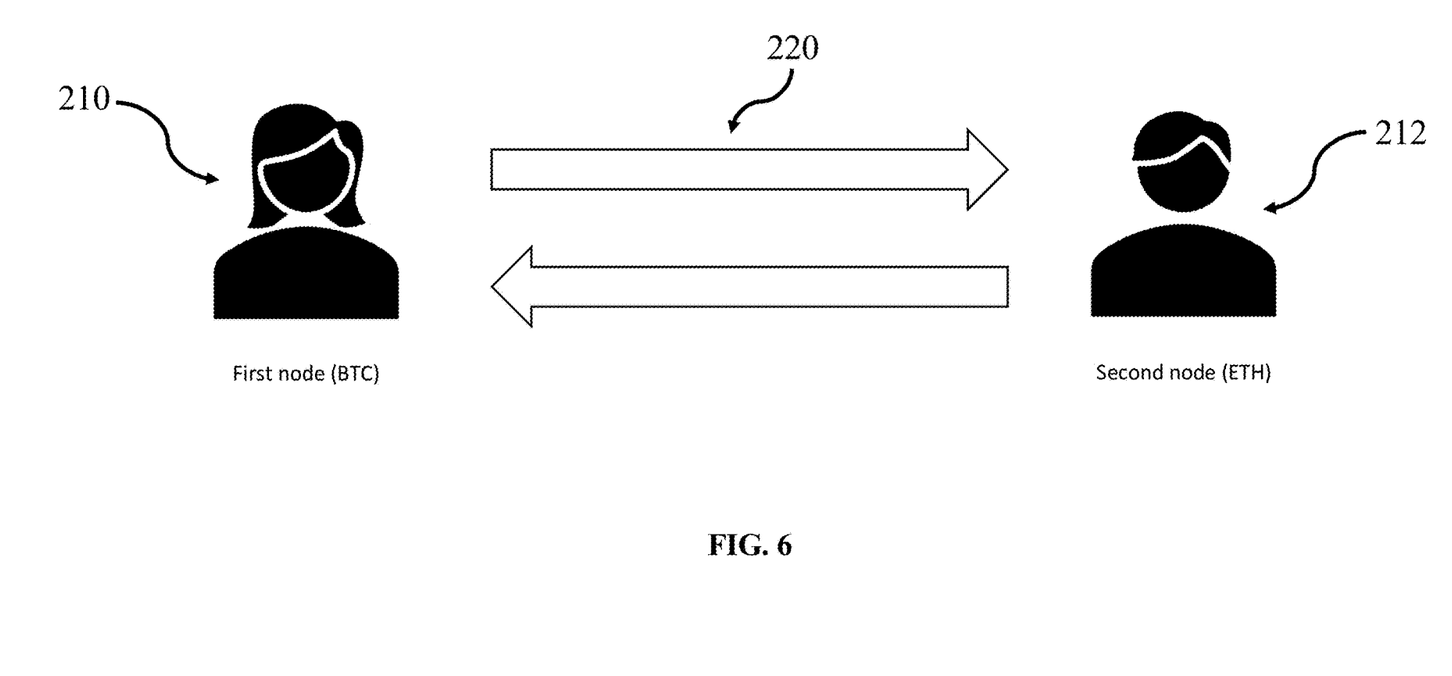
FIG. 6 depicts a schematic diagram illustrating two entities engaged in a trade using a fair-trading protocol according to applications of the various embodiments of the present invention.

FIG. 6 depicts a schematic diagram illustrating two entities 210 and 212 (i.e., two nations) engaged in a Carbon trade using a fair-trading protocol according to the various embodiments of the present invention. Similar to the aforedescribed fair-trading protocol being applied to cryptocurrency markets, application to the digital asset trading in the Carbon market is readily adaptable. In the Carbon market, Carbon trading is an exchange of credits between entities for Carbon emission allowance 220. Since there are fluctuations in the price of the Carbon emission allowance 220 in the Carbon market, a fairness issue in the exchange must be addressed. With the fair-trading protocol of the present invention, an initiator among the entities 210 and 212 for Carbon trading is compelled to consider a compensation fee to be paid to the participator among the entities 210 and 212, which would encourage the initiator to complete the trade early upon an agreement between the initiator and the participator on an exchange rate.

The electronic embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the electronic embodiments may be executed in one or more computing devices including server computers, personal computers, laptop computers, mobile computing devices such as smartphones and tablet computers.

The electronic embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method of providing a protocol for digital asset trading, comprising:

exchanging trading information between a first node and a second node participating in an exchange transaction by a computing system, wherein a first digital currency belonging to the first node and a second digital currency belonging to the second node are expected to be exchanged, and prices of the first and second digital currencies are time-dependent, and wherein each of the first node and the second node is a computing device;

generating a smart contract and an atomic swap script by the computing system;

executing the atomic swap script and the smart contract by the computing system; and processing a redeeming event or a refunding event raised in response to the atomic swap script and the smart contract, comprising determining a compensation fee to be paid to the second node by the first node by the computing system;

wherein the execution of the atomic swap script begins at an initial point to in time, the redeeming event or the refunding event is raised at an action point t in time, and the compensation fee is computed when processing the redeeming or the refunding event such that the compensation fee is determined at t and based on an asset value devaluation of the second node and a maximum potential trading return, which are dependent on the prices of the first and second digital currencies during a time interval from $t_0$ to t; and wherein the smart contract comprises a time limit, $t_1$, on the second node's participation in the exchange transaction, where $t_0 < t < t_1$; and wherein the first node is connected to a first blockchain such that the first digital currency is a cryptocurrency built based on the first blockchain, the second node is connected to a second blockchain such that the second digital currency is a cryptocurrency built based on the second blockchain, and the digital asset trading is a cross-chain transaction.

2. The method of claim 1, further comprising the first node accepting the second digital currency such that the redeeming event is raised;

wherein the determination of the compensation fee comprises a computation governed by:

$$C_t = \max(\max(0, L_t), E_t);$$

$$N_{2,t_0} = N_{1,t_0} * r_{t_0};$$

$$L_t = -(N_{1,t_0} * P_{1,t} - N_{2,t_0} * P_{2,t_0});$$

$E_t=\max(N_{1,t_0}*P_{1,t}-N_{2,t_0}*P_{2,t})$; and $t_0<t<t_1$; and wherein $C_t$ is the compensation fee; $L_t$ is the asset value devaluation of the second node; $E_t$ is the maximum potential trading return; $N_{1,t_0}$ is the first digital currency amount to be traded at time $t_0$; $P_{1,t}$ is price of the first digital currency amount at the action point t; $N_{2,t_0}$ is the second digital currency amount to be traded at time $t_0$; $P_{2,t_0}$ is price of the second digital currency amount at the initial point $t_0$, and $r_{t_0}$ is an exchange rate agreed by the first node and the second node at time $t_0$.

3. The method of claim 1, further comprising the first node refuses to redeem the second digital currency such that the refunding event is raised;

wherein the determination of the compensation fee comprises a computation governed:

$C_t=\max(D_t,E_t)$;

$N_{2,t_0}=N_{1,t_0}*r_{t_0}$;

$D_t=-(N_{2,t_0}*P_{2,t}-N_{2,t_0}*P_{2,t_0})$;

$E_t=\max(N_{1,t_0}*P_{1,t}-N_{2,t_0}*P_{2,t})$; and $t_1<t<t_2$;

wherein $C_t$ is the compensation fee; $D_t$ is the asset value devaluation of the second node; $E_t$ is the maximum potential trading return; $N_{1,t_0}$ is the first digital currency amount to be traded at time $t_0$; $P_{1,t}$ is price of first digital currency amount at the action point t; $N_{2,t_0}$ is the second digital currency amount to be traded at time $t_0$; $P_{2,t_0}$ is price of the second digital currency amount at the initial point $t_0$, and $r_{t_0}$ is an exchange rate agreed by the first node and the second node at time $t_0$.

4. The method of claim 1, wherein the determination of the compensation fee comprises linking to a price database of a cryptocurrency market to retrieve updated prices of the first and second digital currencies.

5. The method of claim 1, wherein exchanging trading information is performed prior to the initial point to, and the trading information comprises at least one of account address, pay amount, transaction fee, Hash160 of secret, lock time of the first and second nodes.

6. The method of claim 1, wherein generating the atomic swap script and the smart contract is performed prior to the initial point to, and the atomic swap script is associated with a locked script and an unlocked script.

7. The method of claim 1, wherein computation of the compensation fee is governed by a series of compensation formulas which are embedded and deployed in the smart contract.

8. The method of claim 1, wherein the digital asset trading is conducted based on Carbon market, and one of the first and second digital currencies represents Carbon emission allowance.

9. An apparatus for providing a protocol for digital asset trading, comprising:
a computing system comprising a first node and a second node which are in communication with each other and configured to:
exchange trading information between the first node and the second node participating in an exchange transaction, wherein a first digital currency belonging to the first node and a second digital currency belonging to the second node are expected to be exchanged and are time-dependent;
generate a smart contract;
generate an atomic swap script;
execute the atomic swap script and the smart contract;
process a redeeming event or a refunding event raised in response to the atomic swap script and the smart contract; and
determine a compensation fee to be paid to the second node by the first node;
wherein each of the first node and the second node is a computing device;
wherein the execution of the atomic swap script begins at an initial point to in time, the redeeming event or the refunding event is raised at an action point t in time, and the compensation fee is computed when processing the redeeming or the refunding event such that the compensation fee is determined at t and based on an asset value devaluation of the second node and a maximum potential trading return, which are dependent on the prices of the first and second digital currencies during a time interval from $t_0$ to t; and
wherein the smart contract comprises a time limit, $t_1$, on the second node's participation in the exchange transaction, where $t_0<t<t_1$; and
wherein the first node is connected to a first blockchain such that the first digital currency is a cryptocurrency built based on the first blockchain, the second node is connected to a second blockchain such that the second digital currency is a cryptocurrency built based on the second blockchain, and the computing system is further configured to execute a cross-chain transaction.

10. The apparatus of claim 9, wherein the computing system is further configured to exchange the first and second digital currencies when the first node accepting the second digital currency such that the redeeming event is raised;

wherein the determination of the compensation fee comprises a computation governed by:

$C_t=\max(\max(0,L_t),E_t)$;

$N_{2,t_0}=N_{1,t_0}*r_{t_0}$;

$L_t=-(N_{1,t_0}*P_{1,t}-N_{2,t_0}*P_{2,t_0})$;

$E_t=\max(N_{1,t_0}*P_{1,t}-N_{2,t_0}*P_{2,t})$; and $t_0<t<t_1$; and wherein $C_t$ is the compensation fee; $L_t$ is the asset value devaluation of the second node; $E_t$ is the maximum potential trading return; $N_{1,t_0}$ is the first digital currency amount to be traded at time $t_0$; $P_{1,t}$ is price of the first digital currency amount at the action point t; $N_{2,t_0}$ is the second digital currency amount to be traded at time $t_0$; $P_{2,t_0}$ is price of the second digital currency amount at the initial point to, and $r_{t_0}$ is an exchange rate agreed by the first node and the second node at time $t_0$.

11. The apparatus of claim 9, wherein the computing system is further configured to allow the first node to refuse to redeem the second digital currency such that the refunding event is raised;

wherein the determination of the compensation fee comprises a computation governed by:

$C_t=\max(D_t,E_t)$;

$N_{2,t_0}=N_{1,t_0}*r_{t_0}$;

$D_t=-(N_{2,t_0}*P_{2,t}-N_{2,t_0}*P_{2,t_0})$;

$$E_t = \max(N_{1,t_0} * P_{1,t} - N_{2,t_0} * P_{2,t}); \text{ and}$$

$$t_1 < t < t_2;$$

wherein $C_t$ is the compensation fee; $D_t$ is the asset value devaluation of the second node; $E_t$ is the maximum potential trading return; $N_{1,t_0}$ is the first digital currency amount to be traded at time $t_0$; $P_{1,t}$ is price of first digital currency amount at the action point t; $N_{2,t_0}$ is the second digital currency amount to be traded at time $t_0$; $P_{2,t_0}$ is price of the second digital currency amount at the initial point $t_0$, and $r_{t_0}$ is an exchange rate agreed by the first node and the second node at time $t_0$.

12. The apparatus of claim 9, wherein the computing system is further configured to link to a price database of a cryptocurrency market to retrieve updated prices of the first and second digital currencies for the determination of the compensation fee.

13. The apparatus of claim 9, wherein trading information is exchanged prior to the initial point to, and the trading information comprises of account address, pay amount, transaction fee, Hash160 of the secret, lock time of the first and second nodes.

14. The apparatus of claim 9, wherein the computing system is further configured to generate the atomic swap script and the smart contract prior to the initial point $t_0$, and the atomic swap script is associated with a locked script and an unlocked script.

15. The apparatus of claim 9, wherein the computing system is further configured to compute the compensation fee governed by a series of compensation formulas which are embedded and deployed in the smart contract.

16. The apparatus of claim 9, wherein the computing system is further configured to conduct the digital asset trading based on Carbon market, and one of the first and second digital currency represents Carbon emission allowance.

* * * * *